Feb. 11, 1958 W. S. BUELL 2,822,780
ANIMAL CAGE
Filed Nov. 2, 1956 2 Sheets-Sheet 1
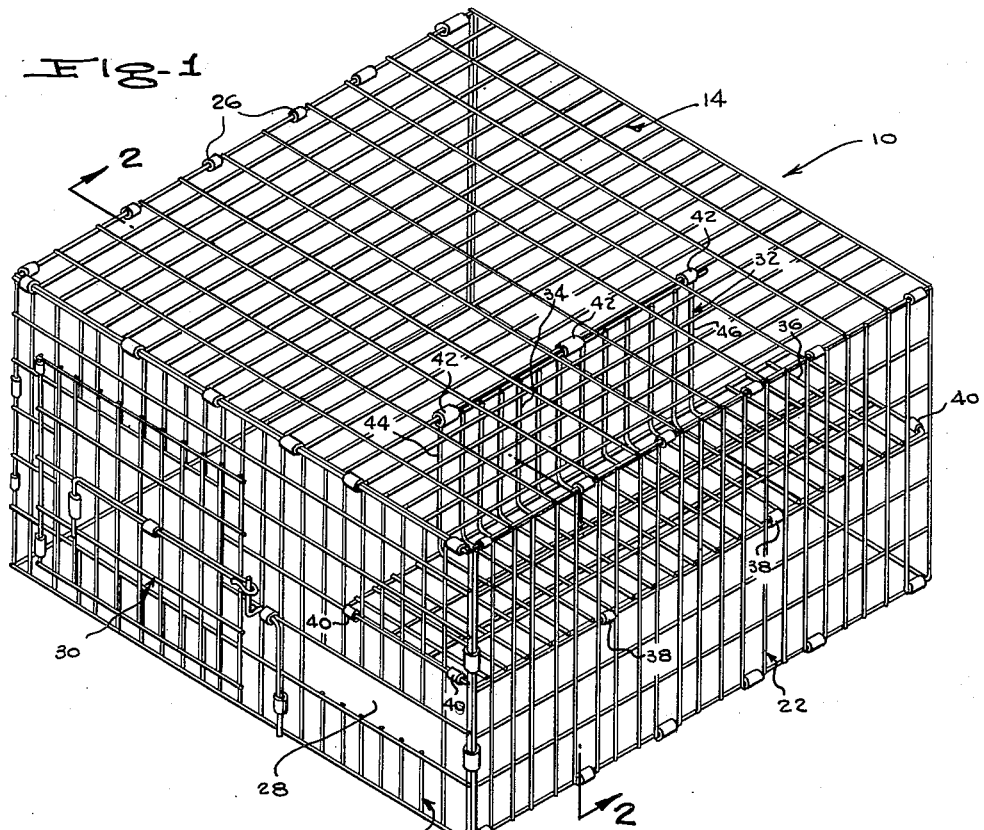
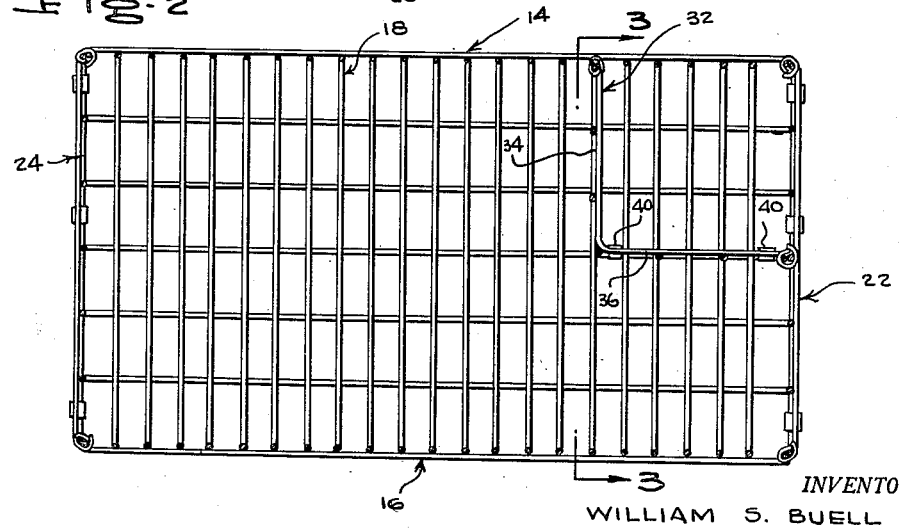
INVENTORS
WILLIAM S. BUELL
BY
McMorrow, Berman + Davidson
ATTORNEYS

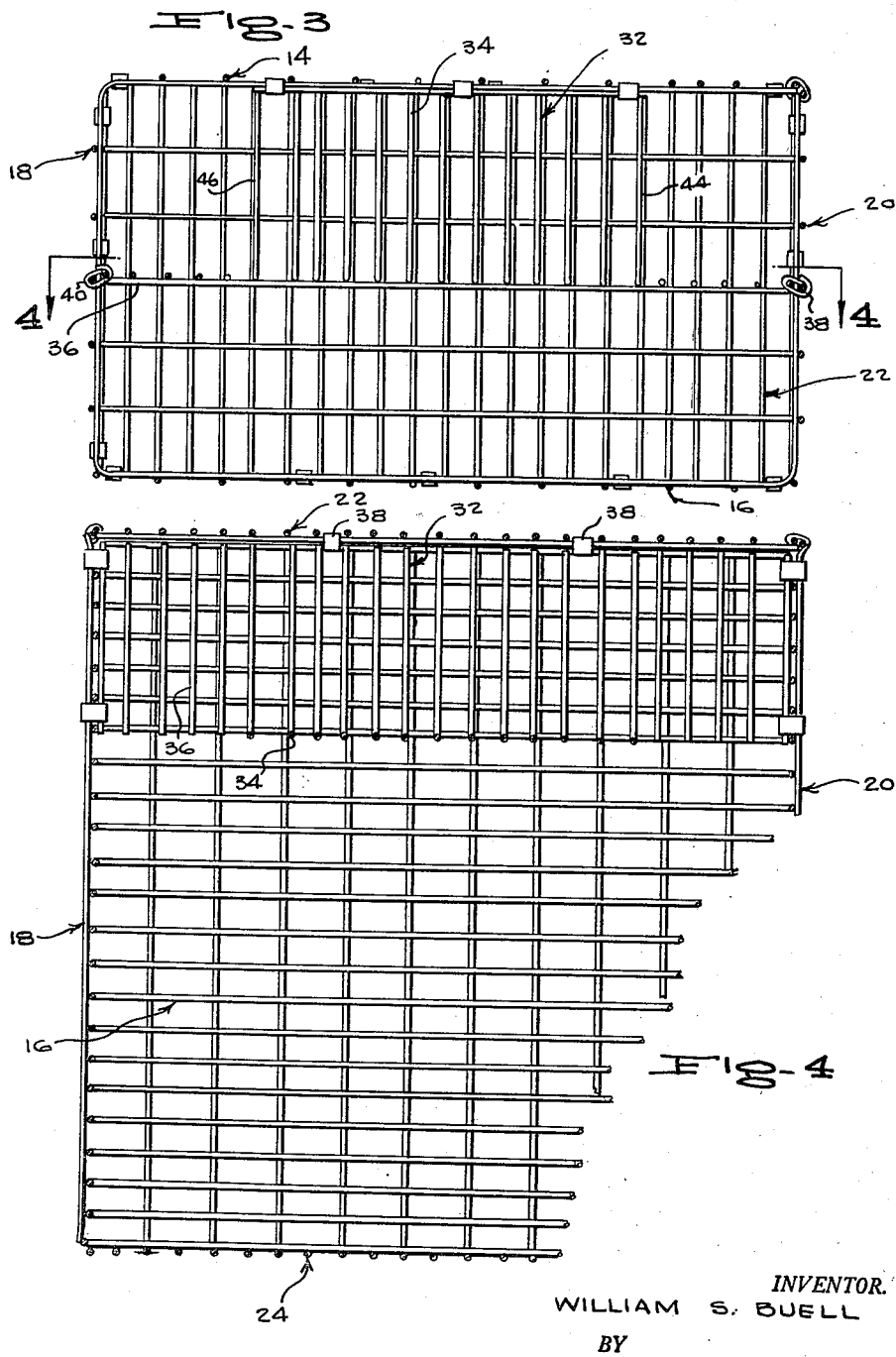

United States Patent Office 2,822,780
Patented Feb. 11, 1958

2,822,780
ANIMAL CAGE
William S. Buell, Steilacoom, Wash.

Application November 2, 1956, Serial No. 619,969

1 Claim. (Cl. 119—17)

This invention relates generally to an improved animal cage incorporating therein a refuge tunnel.

The breeding of fur bearing animals at times is very difficult under the most ideal conditions, and when breeding a pair of chinchillas, at times it is difficult to find a compatible pair. Thus when placing a pair of animals together, in the event one of the animals is relatively timid it is desirable to provide refuge means from its more obstreperous mate. The pelt of a chinchilla is very expensive and accordingly it is highly desirable to prevent the animals from fighting, fur-chewing and the like.

The primary object of the invention is to provide a more practical and efficient animal cage of this kind which is readily and economically manufactured, easily used, and highly satisfactory and practical for the purpose intended.

Other objects and advantages of the invention reside in the details of construction and operation as more fully hereinafter described and claimed, reference being had to the accompanying drawings forming a part hereof, wherein like numerals refer to like parts throughout, and in which:

Figure 1 is a perspective view of a cage in accordance with the present invention, the bottom wall and intersecting far end and side walls being removed for purposes of clarity;

Figure 2 is a vertical longitudinal sectional view taken substantially on line 2—2 of Figure 1;

Figure 3 is a transverse vertical sectional view taken substantially on line 3—3 of Figure 2; and Figure 4 is a fragmentary horizontal sectional view taken substantially on line 4—4 of Figure 3.

Referring to the drawing in detail, the illustrated cage 10 is substantially rectangular and is constructed of a suitable mesh material of any suitable character. The cage 10 includes rectangular top and bottom walls 14 and 16, and side walls 18 and 20, and end walls 22 and 24. The adjacent ends of the walls are secured to each other in any suitable manner, for example, by means of circumposed metal clip elements 26.

Suitably formed on the side wall 20, see Figure 1, is a rectangular horizontally elongated aperture 28 adapted to receive therein a removable feed dish of any suitable character. Also included on the wall 20 is a vertically hinged access door assembly indicated generally at 30.

Indicated generally at 32 is a refuge tunnel which is spaced above the bottom wall 16 of the cage for permitting movement of animals therebeneath, said refuge tunnel 32 having a substantially L-shaped cross section as seen in Figure 2, and includes a vertical panel 34 preferably constructed integral with a horizontal bottom panel 36. The bottom panel 36 is transversely elongated and extends across the width of the cage between the side walls 18 and 20 and along the end wall 22. The near edge of the bottom panel 36 is suitably secured, as by means of clip elements 38, to the end wall 22, and its opposite ends are secured, as by means of clip elements 40 to the side walls 18 and 20. The bottom panel 36 provides a walk way for an animal seeking refuge from the main part of the cage, and is disposed at a desirable height, permitting ready access for such animal. The vertical panel 34, which rises from inner edge of the bottom panel 36, is secured, as by means of suitable clip elements 42, to the top wall 14 of the cage, and at its lower edge is preferably integral with the inner edge of the bottom panel 36. The vertical panel 34 is shorter than the bottom panel 36, and its ends 44 and 46 terminate in spaced relation to the cage side walls 18 and 20, so as to define at opposite ends of the vertical panel 34, entrance and exit openings, permitting entry and exit of a timid animal into the tunnel defined by the cage end wall 22, the bottom panel 36, the vertical panel 34, and related portions of the cage side walls 18 and 20.

Although the refuge tunnel has been described in detail in the exemplary embodiment relative to a specific side wall, the refuge tunnel could be located adjacent any of the other side walls of the enclosure. Furthermore, although the refuge tunnel is disclosed as being constructed of a suitable mesh material, the same may be constructed from solid panel material if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, as fall within the scope of the appended claim.

What is claimed is:

In an animal cage, a substantially rectangular enclosure having top, bottom, side and end walls, a bottom panel in said enclosure extending across the enclosure and secured at its ends to said side walls on a level spaced above said bottom wall, said bottom panel being narrower than the length of said enclosure and having inner and outer edges, said outer edge of the bottom panel being secured to and extending along one of said end walls, and a vertical panel extending along and secured to and rising from said inner edge of the bottom panel and having an upper edge secured to the top wall of the enclosure, said vertical panel being shorter than said bottom panel and having terminal ends spaced from the enclosure side walls to define animal entrance and exit openings at opposite ends of the vertical panel.

References Cited in the file of this patent

UNITED STATES PATENTS 2,713,323 Marsh _____ July 19, 1955
2,728,519 McLarty _____ Dec. 27, 1955